UNITED STATES PATENT OFFICE.

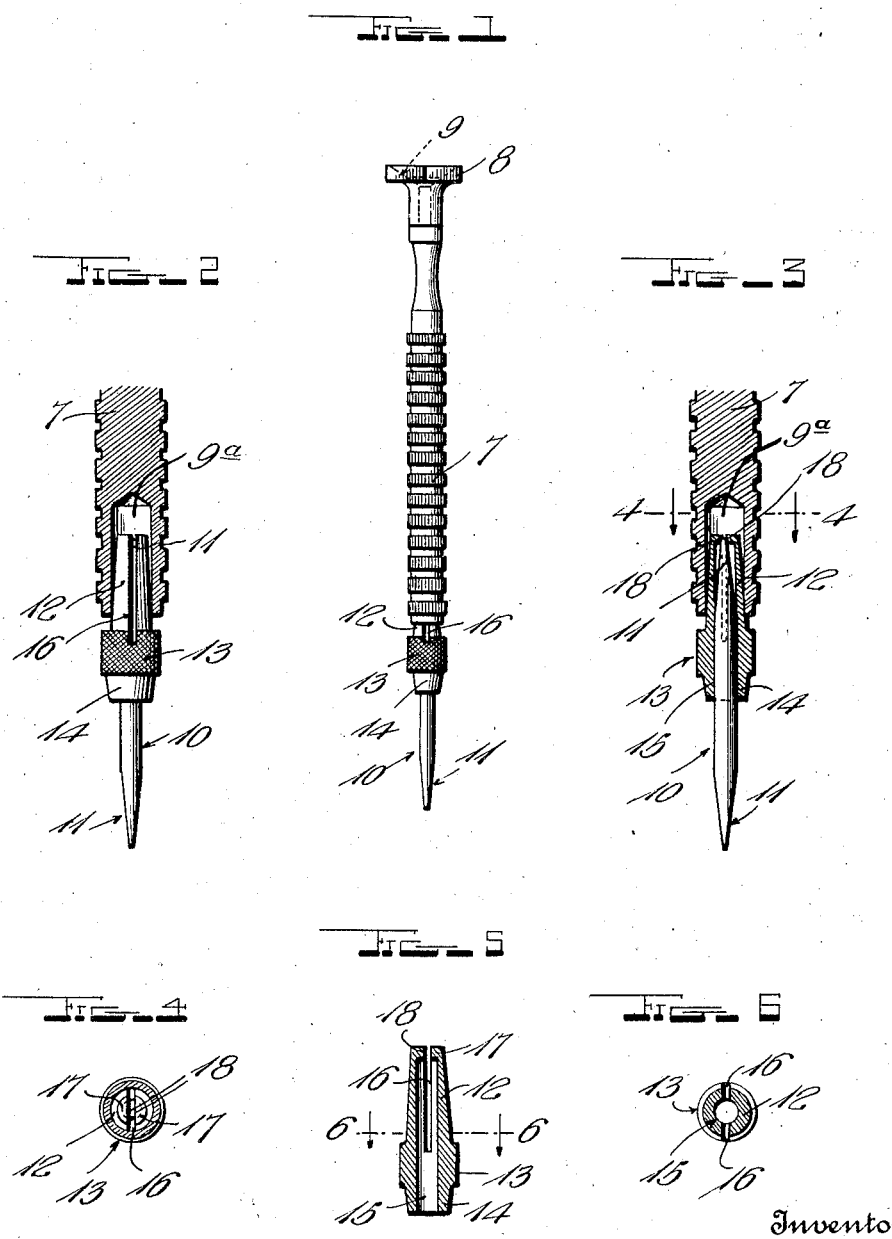

JOHN E. KAMPE, OF WALTHAM, MASSACHUSETTS.

BIT SOCKET OR CHUCK.

1,361,335.   Specification of Letters Patent.   Patented Dec. 7, 1920.

Application filed January 23, 1919. Serial No. 272,737.

*To all whom it may concern:*

Be it known that I, JOHN E. KAMPE, a citizen of the United States, residing at Waltham, in the county of Middlesex and State of Massachusetts, have invented certain new and useful Improvements in Bit Sockets or Chucks; and I do declare the following to be a full, clear, and exact description of the invention, such as will enable others skilled in the art to which it appertains to make and use the same.

This invention relates to rotary tools, and it relates more particularly to an improved bit-socket or chuck.

One object of this invention is to provide a chuck which is especially advantageous in connection with screwdriver-bits, drill-bits, reamers, broaches, etc., and which permits bits or tool members to be interchanged or reversed in the least possible time and with the greatest ease and convenience.

Another object is to provide a chuck of this character which holds the bit or tool-member against turning relative to the chuck or tool-socket, but permits the latter to turn relative to the chuck-socket when excessive turning force is applied.

Another object is to provide a device of this character in which the releasing of the chuck from the chuck-socket automatically releases the bit from the chuck, and in which the tightening of the chuck in the chuck-socket tightens the bit in the chuck.

Another object is to provide a device of this character which consists of few, simple and easily formed parts, and may be manufactured at a comparatively low cost.

Other objects and advantages may become apparent to persons who read the following details of description in connection with the accompanying drawings, in which:

Figure 1 is a side elevation of my improved chuck embodied in a jeweler's screwdriver.

Fig. 2 is an enlarged detail view showing my improved chuck in side elevation, the shaft or handle of the screwdriver being in longitudinal section.

Fig. 3 is a view similar to Fig. 2 except that the chuck is shown in longitudinal section.

Fig. 4 is a transverse sectional view on the line 4—4 of Fig. 3.

Fig. 5 is a longitudinal vertical section of the chuck removed from the chuck-socket of the screwdriver-shaft.

Fig. 6 is a transverse sectional view along the line indicated at 6—6 in Fig. 5.

Referring to these drawings in detail, in which similar reference characters correspond with similar parts throughout the several views, the screwdriver shank 7 may be of any appropriate construction, but preferably being provided with a pivotally mounted head 8 which is counter-sunk or concaved at 9 to receive the finger tip of a jeweler or other operator. This shaft 7 is essentially formed with a socket $9^a$ which is preferably cylindrical or circular in cross section. Likewise, the screwdriver-bit 10 may be of any preferred construction, but having flattened end portions 11 which are interchangeable by reversing these ends; the middle portion of the bit 10 being preferably cylindrical. The structure described in the foregoing is not claimed except in combination with my improved chuck which will now be described as follows:

Referring especially to Figs. 2 and 5, it will be seen that the chuck consists of a single piece of material, preferably steel or other somewhat springy metal, and it comprises a tapering shank 12, a knurled finger-piece or actuating element 13 and a mouth-piece 14 which is preferably smaller in diameter than the element 13 and is tapered toward the open end of a cylindrical bore 15 which extends approximately but not quite to the small end of the tapering shank 12. A slot 16 extends through the small end of the shank 12 to and slightly past the base or large end of the shank 12, and this provides a pair of jaws 17 having flat surfaces 18 which extend from the extreme end of the shank 12 to the adjacent end of the bore 15. These jaws 18 are adapted to clamp the contiguous flat end 11 of the bit 10, when the latter is in its normal position shown in Figs. 1, 2 and 3. The clamping of the flat end 11 is effected by the spring action of the split shank 12, and this spring action is increased when the sides or jaw members of the shank are compressed by forcing the shank axially or longitudinally into the socket $9^a$.

Although this form of chuck is useful in holding tool members other than screwdriver-bits, it is especially advantageous as an element of a jeweler's screwdriver, because it is necessary to change or reverse the screwdriver-bits very often and very quickly while operating upon a clock or watch having screws of many shapes and sizes; and it will be seen that such changes may be made very quickly and easily with this device, as it is only necessary to grasp the knurled actuating element of finger-piece 13 with one hand, while holding the shaft 7 with the other, turning the element 13 while moving it outward from the socket 9, and thereby allowing the jaws 11 to lessen their grip on the screwdriver-bit to allow the latter to be quickly and easily withdrawn from the bore 15. When securing a bit in position for use, the same is inserted in the bore 15 so that its cylindrical portion fits closely within the bore 15 while one of its flat ends 11 extends between the jaws 17. By forcing the tapering flat end 11 inward, the jaws 17 are slightly pressed apart, and their spring action exerts a clamping pressure sufficient to hold the bit against gravity, so that it will not fall from the chuck or bit-socket when the latter is out of engagement with the chuck-socket 9, but such clamping pressure is easily overcome by the operator when it is desired to remove the bit. Now, having thus secured the bit in the chuck, the tapering shank of the latter is pressed longitudinally into the socket 9, and this movement compresses the shank 12, or tends to press the jaws 17 toward one another so as to increase the clamping pressure thereof, not only upon the flat portion of the bit, but also upon the cylindrical portion embraced between the jaws 17.

Although I have described this embodiment of my invention very specifically, it is not intended to limit this invention to these exact details of construction and arrangement of parts but I am entitled to make changes within the scope of the inventive idea disclosed in the foregoing description and following claims.

What I claim as my invention is:

1. The combination with a handle having a holder receiving socket, of a detachable screw-driver-bit holder having a one piece body enlarged adjacent its forward end to provide a collar and to have the rear of the collar tapered to provide a shank, the body being drilled longitudinally from its forward end to a point adjacent its rear end to provide a bit receiving pocket, the shank being spilt longitudinally from its rear end to allow the shank to be expanded by the introduction of a bit and to be compressed to hold the bit by introduction of said holder into the socket of the handle.

2. A detachable screw-driver-bit holder having a one piece body tapered rearwardly to provide a shank, the body being drilled longitudinally from its forward end to a point adjacent its rear end to provide a bit receiving pocket, the shank being split longitudinally from its rear end to allow the shank to be expanded by the introduction of a bit and to be compressed to hold the bit by introduction of said holder into the holder receiving socket of a handle.

In testimony whereof I have hereunto set my hand.

JOHN E. KAMPE.